(12) United States Patent
Sahlin et al.

(10) Patent No.: US 8,743,941 B2
(45) Date of Patent: Jun. 3, 2014

(54) SPATIAL AND TEMPORAL PRE-EQUALIZATION

(75) Inventors: Henrik Sahlin, Molnlycke (SE); Bjorn Ulf Anders Sihlbom, Vastra Frolunda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 93 days.

(21) Appl. No.: 13/513,041

(22) PCT Filed: Dec. 1, 2009

(86) PCT No.: PCT/EP2009/066138
§ 371 (c)(1),
(2), (4) Date: May 31, 2012

(87) PCT Pub. No.: WO2011/066851
PCT Pub. Date: Jun. 9, 2011

(65) Prior Publication Data
US 2012/0236924 A1    Sep. 20, 2012

(51) Int. Cl.
*H03H 7/30* (2006.01)
(52) U.S. Cl.
USPC ........... 375/232; 375/343; 375/260; 375/267; 370/312; 370/329

(58) Field of Classification Search
USPC .................... 375/232, 343, 260, 267
See application file for complete search history.

(56) References Cited

U.S. PATENT DOCUMENTS

| | | | |
|---|---|---|---|
| 2002/0159537 A1* | 10/2002 | Crilly, Jr. ...................... | 375/267 |
| 2008/0137635 A1 | 6/2008 | Pan et al. | |
| 2013/0177050 A1* | 7/2013 | Kent et al. ...................... | 375/219 |

FOREIGN PATENT DOCUMENTS

| | | |
|---|---|---|
| EP | 1507350 A1 | 2/2005 |
| WO | 2009084990 A1 | 7/2009 |

* cited by examiner

*Primary Examiner* — Eva Puente
(74) *Attorney, Agent, or Firm* — Rothwell, Figg, Ernst & Manbeck, P.C.

(57) ABSTRACT

The present invention describes a channel equalizer and a method for channel equalization in a receiver in a multi-user communication system. The method comprises the steps of receiving a signal with at least two antennas to produce at least two antenna input streams, measuring the temporal of each antenna input stream and the spatial correlation between the antenna input streams, determining a user-independent pre-equalization filter from the temporal and spatial correlation, filtering the antenna input streams with the pre-equalization filter, and finally inputting the filtered signal to a user-dependent receiver configured to detect the received data symbols of a given user.

14 Claims, 8 Drawing Sheets

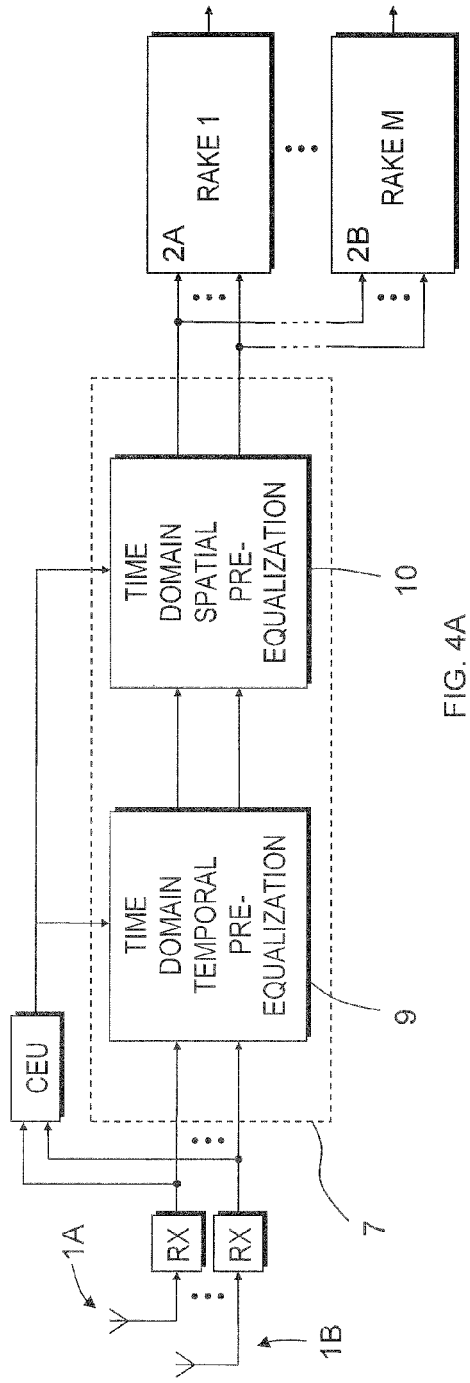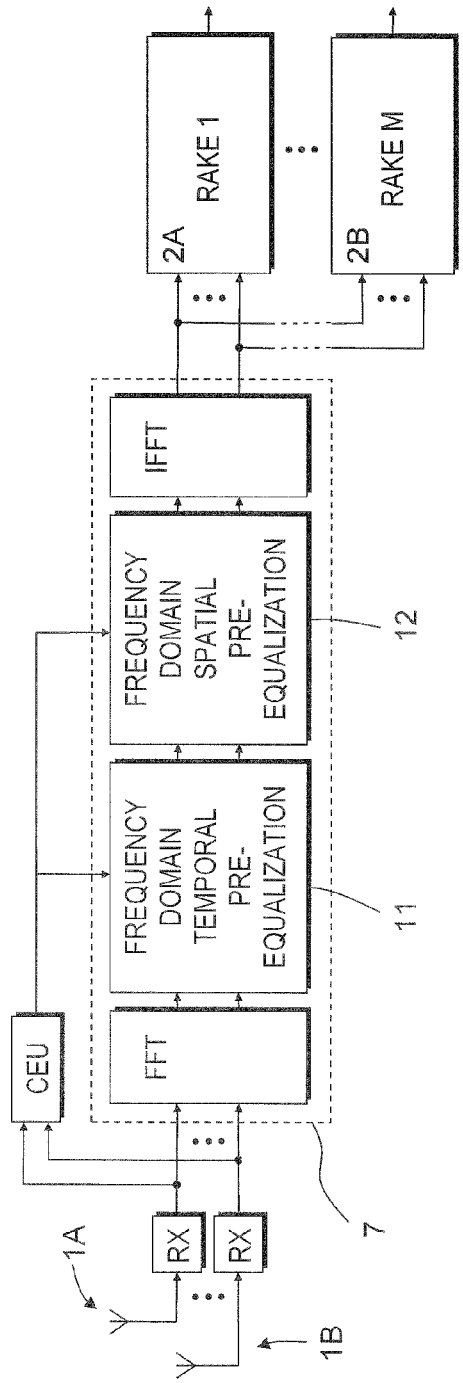

SPATIAL AND TEMPORAL PRE-EQUALIZATION

CROSS-REFERENCE TO RELATED APPLICATION

This application is a 35 U.S.C. §371 National Phase Entry Application from PCT/EP2009/066138 filed Dec. 1, 2009, and designating the United States.

TECHNICAL FIELD

The present invention relates to a channel equalization method used in a multi-user communication system. While the invention particularly relates to a WCDMA communication system, it should be noted that it could be applicable to other communication systems, including LTE, WiMAX, WiFi, UWB, GSM, etc. The invention is low complexity user-independent spatial and temporal minimum mean square error (MMSE) pre-equalization.

BACKGROUND

In any wireless communication system, the transmitted signal is distorted due to the dynamic properties of the wireless channel. These dynamics leads to a frequency selective channel. Therefore, at the receiver side, some kind of equalization scheme can be applied in order to compensate for dynamics of the wireless channel. An ideal compensation would cancel the effects of the radio channel and make the resulting equalized channel completely frequency-flat. However, such a scheme would in most, cases lead to unwanted noise amplification which limits the performance. The equalization scheme should also suppress interference by decorrelation of the receiver antennas. Equalization schemes must therefore provide a trade-off between interference suppression, noise amplification and making the equalized channel frequency-flat.

In third generation cellular systems (including both WCDMA and CDMA2000), direct sequence code division multiple access (DS-CDMA) is adopted as multiple access scheme. CDMA is a spread spectrum technique that uses specially designed spreading sequences to spread symbol-level data to higher bandwidth chip-level sequences. One notable advantage of CDMA is its ability to exploit the multipath diversity of the wireless channel by combining the different propagation delays of the received signal. This is possible when the spreading sequences are selected in such a way that their autocorrelation function is (or at least approximately is) zero for time shifts different from zero. The most commonly used receiver for CDMA over multipath channels is the Rake receiver (2, 2A, 2B). The Rake receiver is so named because its structure resembles a garden rake, where each rake finger collects the energy corresponding to a certain propagation delay (5A-B, 5C-D, 5E-F and 5G-H).

FIG. 1A illustrates a CDMA multi-user receiver with N receive antennas that employs Rake receivers for each of the M users. The N antenna branches are coupled to an RF front-end (RX) which encompasses circuitry for transforming the received signals to baseband. Hence, the RF front-end outputs N antenna input streams, which are used as inputs to M user-specific Rake receivers (2A, 2B). FIG. 2A illustrates the conventional Rake receiver that is employed for each user in the multi-user receiver of FIG. 1A. Each of the N input streams are fed to a Rake receiver and assigned to one or multiple Rake fingers (5A-H). The Rake fingers are allocated by the path searcher (4A), which analyzes a power delay profile of the received signal and assigns a finger to each multipath component with an energy level above a certain threshold. The main function of each finger is to despread its multipath component from chip-level back to symbol-level. After despreading, the symbol-level outputs of the Rake fingers are combined by a maximal ratio combiner (MRC). The MRC (6A) is an optimum combiner which weights the symbol-level output symbols in proportion to the signal power of each finger. In the MRC, a weight estimation unit (WEU) extracts a pilot sequence from the despread signal of each finger to determine the MRC weight.

The conventional Rake receiver is optimal for demodulating a COMA signal in the presence of white noise. However, in presence of multi-user interference (MUI), normally encountered in cellular systems, the noise may be colored and the RAKE receiver is no longer optimal and may even be very far from the optimal receiver. A better solution in this case would be to employ an MMSE-optimized Rake or Generalized Rake (G-Rake) receiver for each user. An example of a MMSE-Rake/G-Rake receiver for N receive antennas is illustrated in FIG. 2B.

The MMSE-Rake and G-Rake receivers (3, 3A, 3B) have a similar structure to that of the conventional Rake receiver (2, 2A, 2B). There are, however, some details that differentiate them from the conventional Rake receiver. First, the number of Rake fingers, determined by the path searcher (4B), may be larger than the number of multipath components indicated on the power delay profile. Second, the weight estimation unit (WEU-2) needs to take ail fingers into account when the weights used for MRC (6B) are computed. Hence, the weight estimation unit (WEU-2) of an MMSE-optimized Rake or G-Rake is considerably more computationally intensive than for the conventional Rake receiver.

The MMSE-optimized Rake receiver offers improved performance over a conventional Rake receiver at the cost of a more computationally intensive implementation. Hence, in a receiver node with limited computational capabilities one may only afford to use MMSE-Rake or G-Rake receivers for a few prioritized users, while remaining users have to accept the lower level of service offered by the conventional Rake receiver.

SUMMARY

According to the present invention, the problem of providing a computationally simple yet MMSE-optimized receiver is solved by user-independent temporal and spatial pre-equalization of the antenna input streams. Unlike the G-Rake and MMSE-Rake solutions (3, 3A, 3B), the computational complexity of the proposed method in relation to a conventional Rake receiver does not increase with the number of users.

The present invention describes a method for channel equalization in a receiver in a multi-user communication system. The method comprises the steps of:
  receiving (601) a signal with at least one antenna to produce at least one antenna input stream,
  measuring (602) the temporal correlation of the at least one antenna input stream and, moreover, measuring (602) the spatial correlation between the antenna input streams when at least two antenna input streams are provided,
  determining (603) a user-independent pre-equalization filter (7) from the temporal correlation when at least one antenna input stream is provided or determining a user independent pre-equalization filter from the temporal correlation and the spatial correlation when at least two antenna input streams are provided, filtering (604) the at least one antenna input stream with the user independent pre-equalization filter (7), inputting (605) the at least one filtered stream to at least one user-dependent receiver (2A, 2B).

Moreover, the method concerns the cases wherein:

the multi-user communication system is a CDMA communication system and the user-dependent receiver is a Rake receiver (2A, 2B).

the filtering is divided into two processes respectively corresponding to temporal pre-equalization (9) and spatial pre-equalization (10), the temporal pre-equalization and the spatial pre-equalization are performed subsequently, the temporal pre-equalization is performed on each antenna input stream separately, the user-independent pre-equalization filtering is performed fully or partially in frequency domain (FIGS. 3B, 4B and 5).

The present invention also describes a receiver node in a multi-user communication system. The receiver node comprising:

at least one antenna (1A, 1B) for receiving at least one antenna input stream, a correlation estimation unit (CEU) for measuring the temporal correlation of the at least one antenna input stream or the temporal and spatial correlation of at least two antenna input streams, a user-independent pre-equalization filter (7) to compensate for said temporal correlation or said temporal and spatial correlation, at least one user-dependent receiver (2A, 2B) configured to detect the received data symbols of a given user.

Moreover, the receiver node concerns the cases wherein:

the multi-user communication system is a CDMA multi-user communication system and the user-dependent receiver is a Rake receiver (2A, 2B), the pre-equalization filter is divided into two stages respectively corresponding to temporal pre-equalization (9, 11) and spatial pre-equalization (10, 12), the temporal pre-equalization filter and the spatial pre-equalization filter are arranged in series, the temporal pre-equalization filtering is performed separately on each antenna input stream (not shown), the user-independent pre-equalization filtering is performed fully or partially in frequency domain (FIG. 3B, FIG. 4B and FIG. 5).

The proposed pre-equalization is user-independent and the processing is done on all receiver antennas but only once, independent of the number of users. Thus, in a multi-user receiver, which demodulates and detects a large number of users, the computational complexity per user will be very low on average. The pre-equalization can be performed in one stage or divided into two stages corresponding to temporal and spatial pre-equalization, respectively. By dividing the pre-equalization info two separate stages, the computational complexity is further reduced.

BRIEF DESCRIPTION OF THE DRAWINGS

FIG. 4a shows a second embodiment of the present invention, FIG. 4b shows an alternative of the second embodiment.

DETAILED DESCRIPTION

Figure 5:
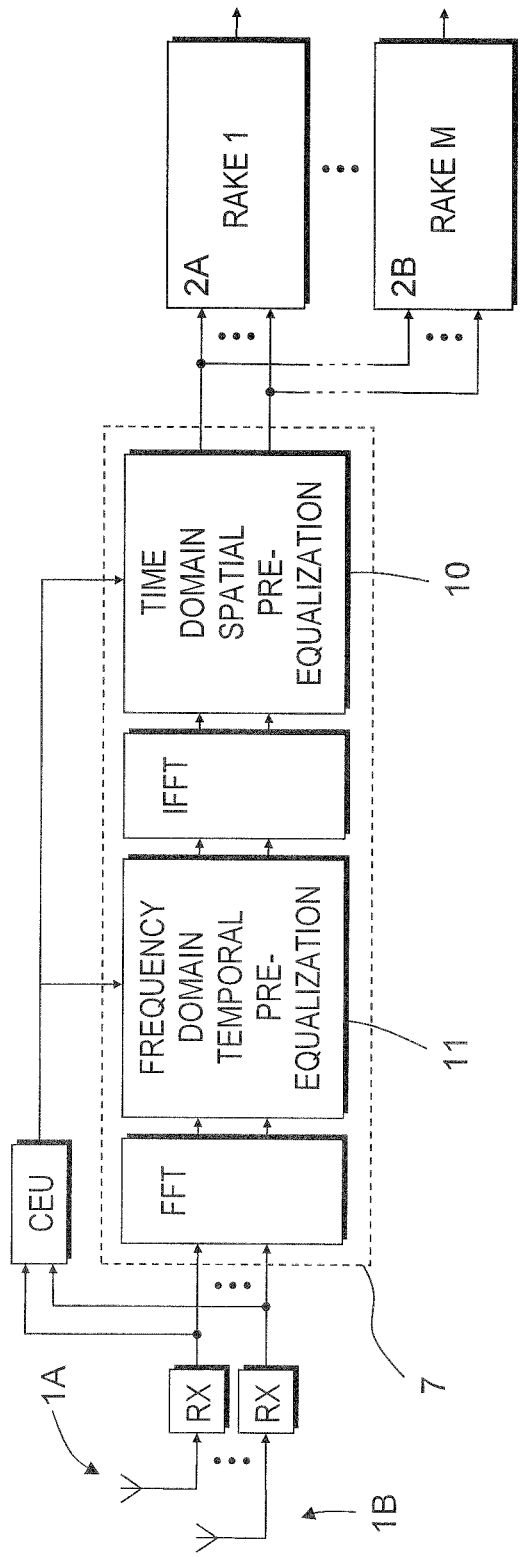
FIG. 5 shows a third embodiment of the present invention.
Figure 6:
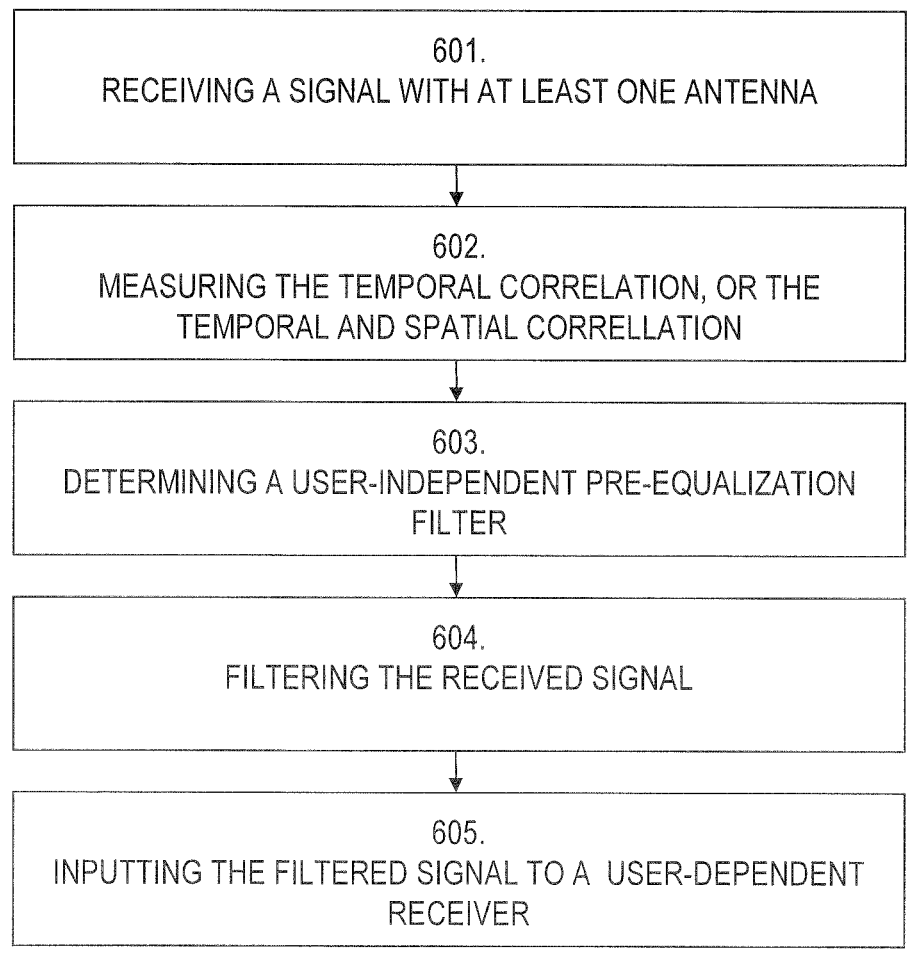
FIG. 6 shows a flowchart of the channel equalization method of the present invention.

Three embodiments of the present invention are described in detail below with reference to FIGS. 3-5. Common elements in all embodiments are N receive antennas (1A, 1B), RF front-end circuitry (RX) for each antenna to transform the received signal to baseband, a correlation estimation unit (CEU) for measuring the spatial and temporal correlation, a spatial and temporal pre-equalization filter (7) and M user-specific receivers (2A, 2B). It should be noted that the scope of the present invention is not limited to the particular embodiments described herein, but only limited by the appended claims.

Figure 1A:
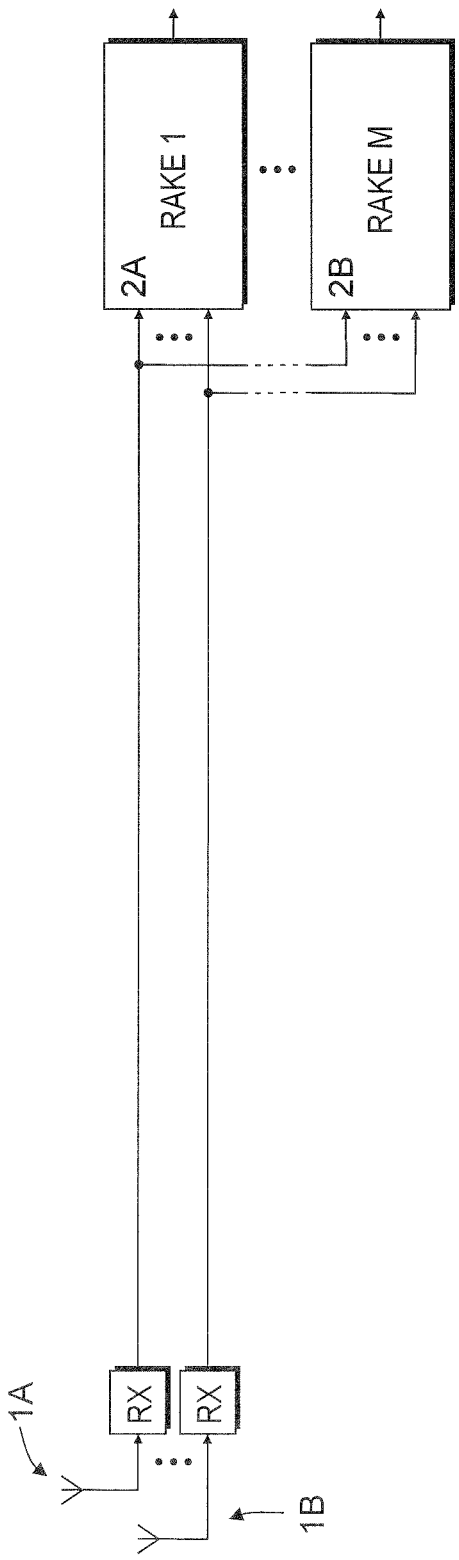
FIG. 1 shows a multi-user receiver where each user is detected with a conventional Rake, an MMSE-optimized Rake or a G-Rake receiver.
Figure 1B:
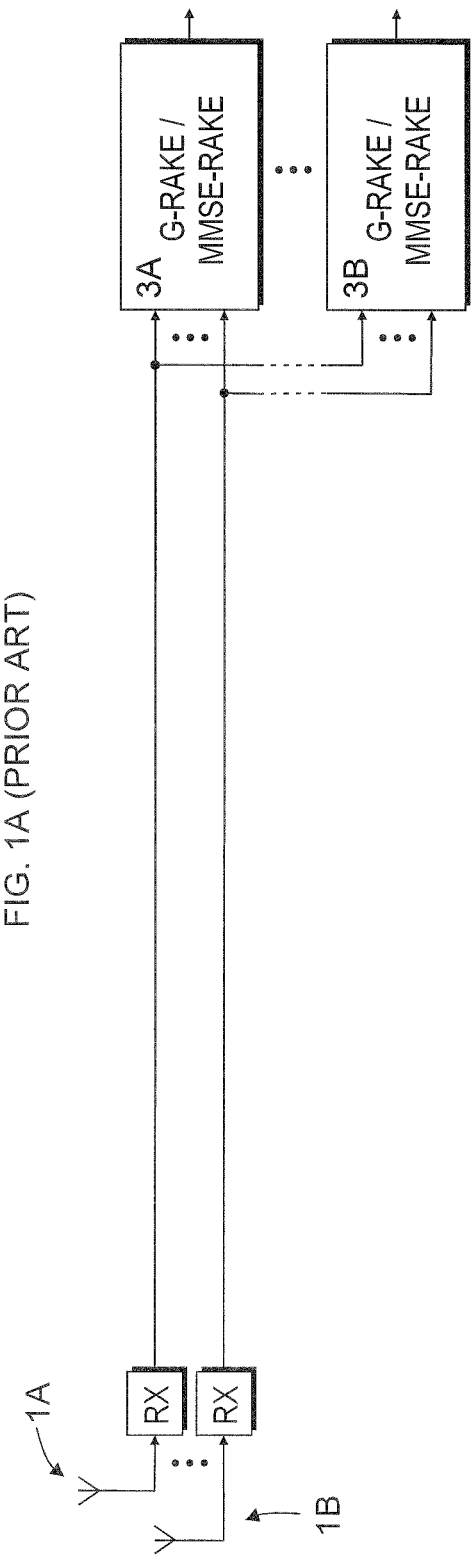
Figure 2A:
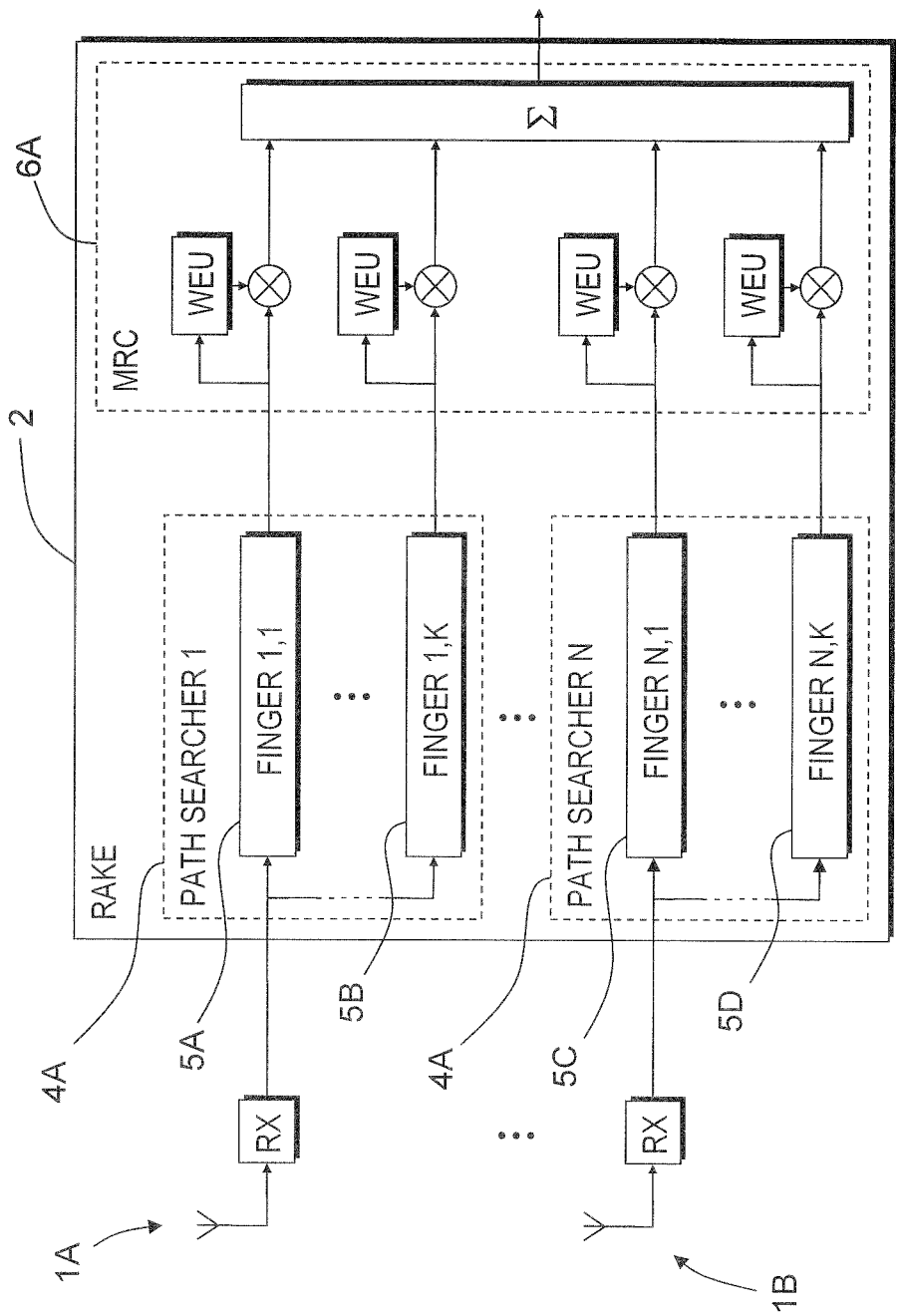
FIG. 2a shows a conventional Rake receiver.
Figure 2B:
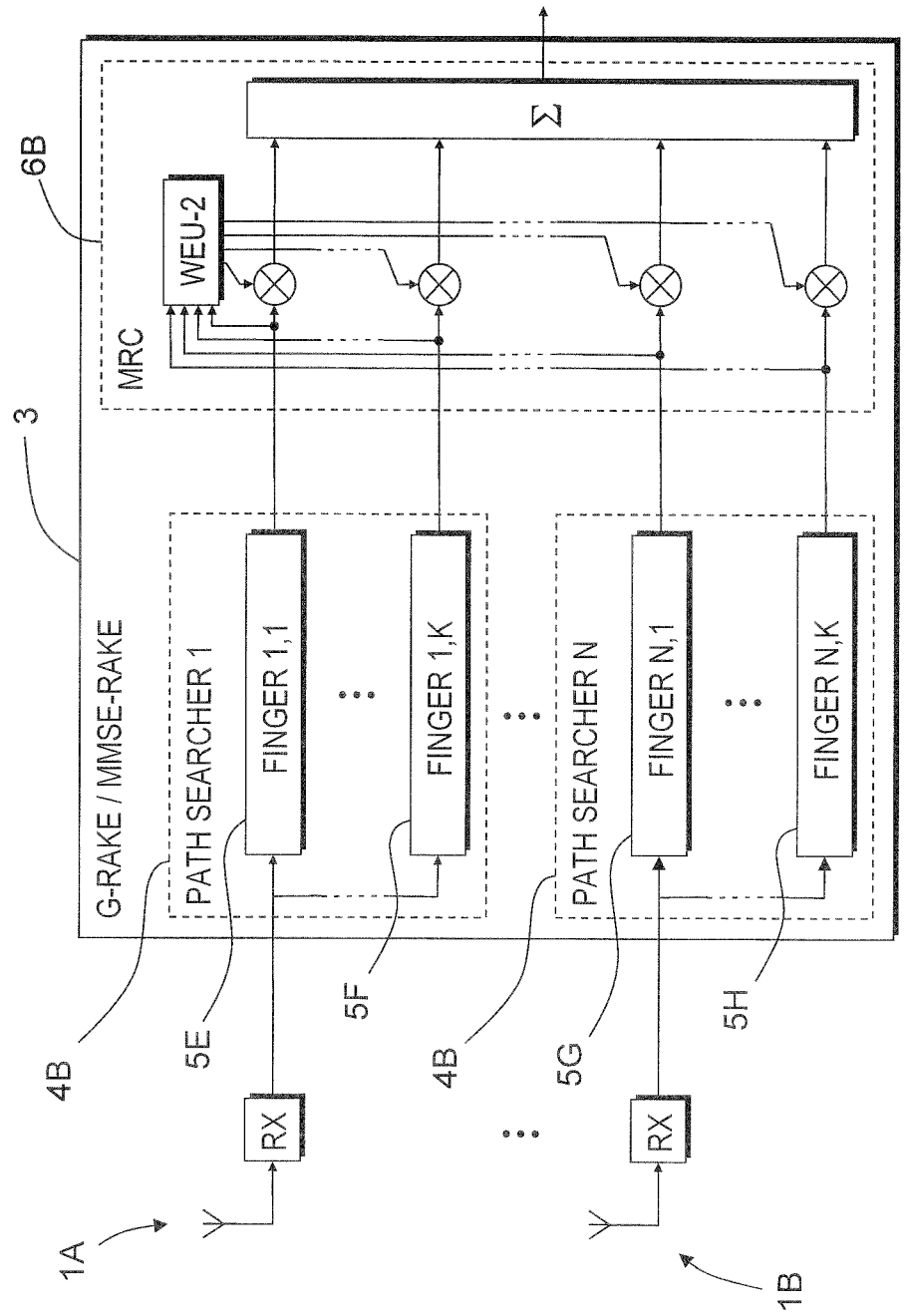
FIG. 2b shows an MMSE-optimized Rake receiver.
Figure 3A:
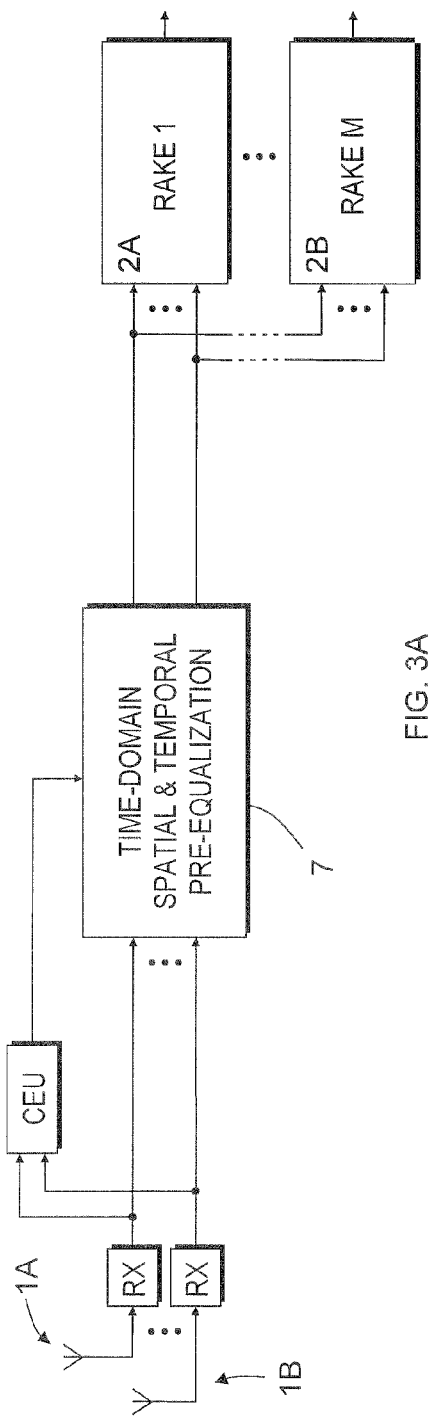
FIG. 3a shows a first embodiment of the present invention.
Figure 3B:
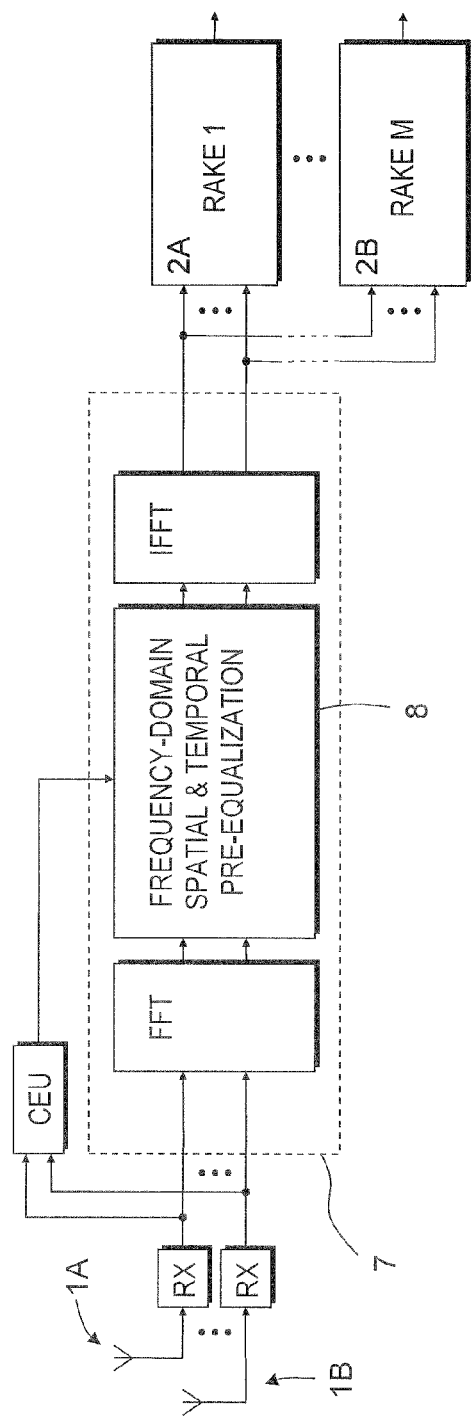
FIG. 3b shows an alternative of the first embodiment.
Figure 7:
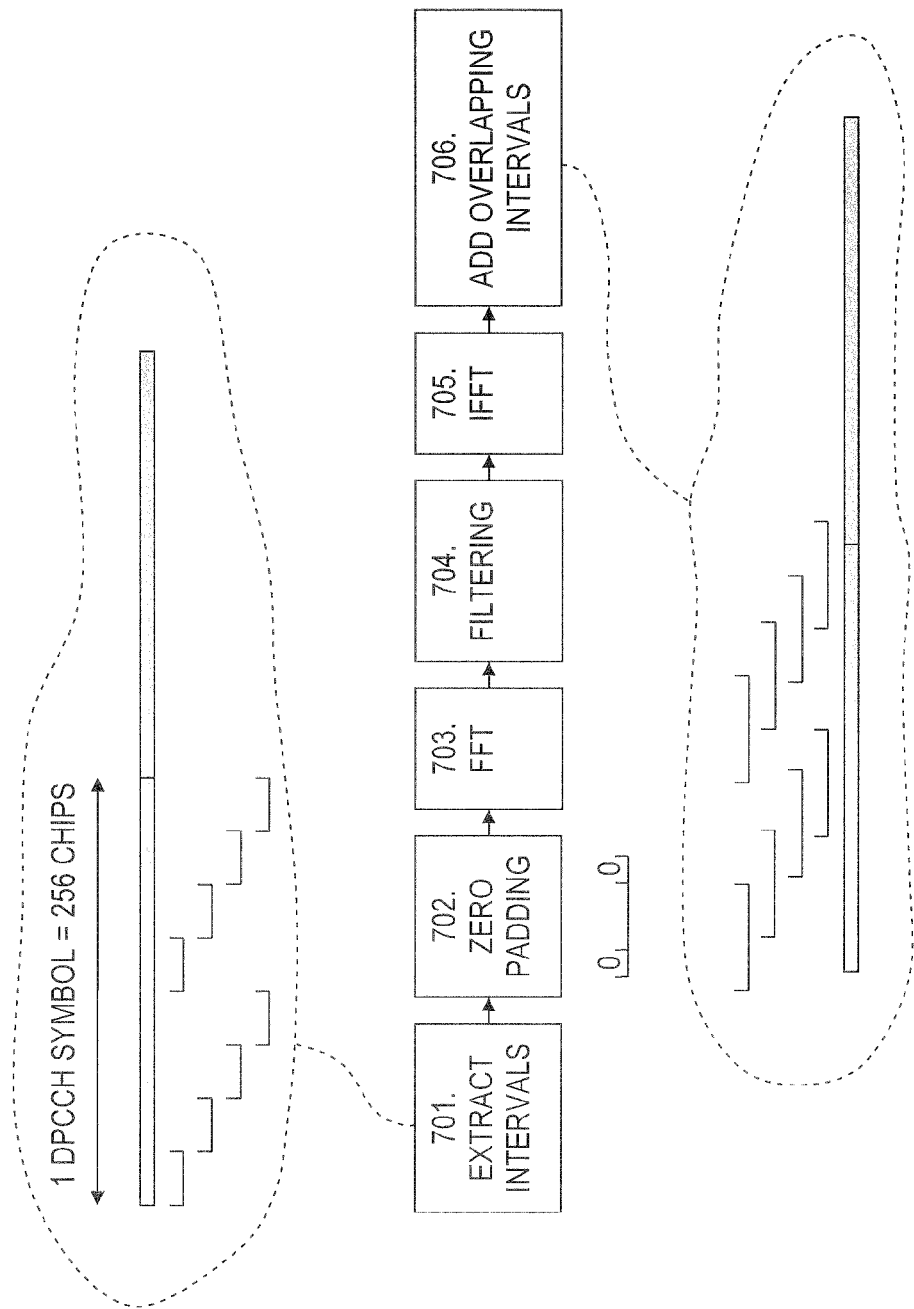
FIG. 7 shows a flowchart of the overlap-add FFT method.

In the description below, the temporal filtering is performed in the frequency domain. Several methods exist to generate the frequency domain representation of a time domain signal. In FIGS. 3B, 4B and 5, the time to frequency domain conversion is illustrated with a fast Fourier transform (FFT) module and the frequency to time domain conversion with an inverse fast Fourier transform (IFFT) module. In FIG. 7, a more detailed description illustrates how the overlap-add method for FFT and IFFT works. Here, short non-overlapping segments of samples in the time domain are extracted (701) and padded with zeros (702) to compensate for the time domain convolution. By means of an FFT, the time-domain blocks are converted to frequency domain (703). Temporal filtering (704) is now done as an element wise multiplication for each frequency index. The filtered blocks are converted back to the time domain with an IFFT (705), and the time domain signal is obtained by overlapping the filtered segments and adding them together.

It should be noted that it is well-known to a person skilled in the art that frequency domain filtering may be equivalent performed in the time domain. Hence, the present invention is not restricted to frequency domain filtering and may equivalent be implemented in time domain as illustrated in FIGS. 3A and 4A. The advantage of using frequency domain filtering is that the convolution operation of a time domain filter becomes a simple element-wise multiplication. In the following, each block of frequency domain samples is enumerated with block index k.

A vector with Nr received signals in the frequency domain, for frequency m and frequency domain block number k, can be modeled as $$V(m,k)=H(m,k)Z(m,k)+\eta(m,k), \quad (1)$$

where $\eta(m,k)$ is a vector with additive noise and interference, $Z(m,k)$ is transmitted signal from one user, and $$H(m,k) = \begin{bmatrix} h_0(m,k) \\ h_1(m,k) \\ M \\ h_{N_r-1}(m,k) \end{bmatrix} \quad (2)$$

is the radio channel matrix.

A multi-antenna formulation of the MMSE combining coefficients equals $$W_{MMSE}(m, k) = \begin{bmatrix} W_{MMSE,0}(m, k) \\ W_{MMSE,1}(m, k) \\ \vdots \\ W_{MMSE,N_r-1}(m, k) \end{bmatrix} \quad (3)$$

$$= (\hat{R}(m, k))^{-1} \hat{H}(m, k)$$

$$= \left( \begin{bmatrix} R_{0,0}(m, k) & \Lambda & R_{0,N_r-1}(m, k) \\ R_{1,0}(m, k) & & \\ M & O & \\ R_{N_r-1,0}(m, k) & & R_{N_r-1,N_r-1}(m, k) \end{bmatrix} \right)^{-1} \begin{bmatrix} \hat{h}_0(m, k) \\ \hat{h}_1(m, k) \\ M \\ \hat{h}_{N_r-1}(m, k) \end{bmatrix},$$

where $\hat{H}(m, k)$ is an estimated channel matrix for a specific user and $$\hat{R}(m, k) = \begin{bmatrix} R_{0,0}(m, k) & \Lambda & R_{0,N_r-1}(m, k) \\ R_{1,0}(m, k) & & \\ M & O & \\ R_{N_r-1,0}(m, k) & & R_{N_r-1,N_r-1}(m, k) \end{bmatrix}, \quad (4)$$

Is the estimated multi-antenna periodogram (a.k.a. power density spectrum) for frequency index m. The multi-antenna periodogram can be estimated as a moving average $$\hat{R}(m, k) = \sum_{l=0}^{k} \alpha(l) \cdot V(m, l) \cdot V^{*T}(m, l), \quad (5)$$

where $\alpha(l), l=0,1K,k$, are suitable scaling coefficients, e.g. $\alpha(l)=1/(k+1)$. Alternatively this multi-antenna periodogram matrix is estimated in a recursive manner, $$\hat{R}(m,k)=(1-\alpha_{Spec})\hat{R}(m,k-1)+\alpha_{Spec}V(m,k)\cdot V^{*T}(m,k), \quad (6)$$

where $\alpha_{Spec}$ is a suitable forgetting factor, e.g. $\alpha_{Spec}=0.01$. Several possible ways of combining these moving average and recursive estimators are possible.

The frequency domain MMSE combining can now be formulated as $$Z_{MMSE}(m)=(W_{MMSE}(m))^{*T}V(m). \quad (7)$$

A single antenna frequency domain MMSE combining can be formulated as $$Z_{MMSE}(m) = (W_{MMSE}(m))^* V(m), \quad (8)$$

where $$W_{MMSE}(m) = \frac{\hat{H}(m)}{\hat{R}(m)} \quad (9)$$

is an MMSE frequency domain filter coefficient, $\hat{H}(m)$ is estimated frequency domain channel net response, and $\hat{R}(m)$ is estimated periodogram of received signal.

First Embodiment

In the first embodiment of the invention, both the temporal and spatial pre-equalization can be done within a single stage (7, 8) as illustrated in FIG. 3. Denote received frequency domain samples from all antennas (1A, 1B) by $$V(m, k) = \begin{bmatrix} V_0(m, k) \\ V_1(m, k) \\ M \\ V_{N_r-1}(m, k) \end{bmatrix}, \quad (10)$$

for frequency index m, which is based upon a time interval (or block) of received samples. This block is enumerated by k. Frequency domain spatial and temporal pre-equalization (8) is done as an element-wise multiplication with $W_{pre}(m,k)$. We have $$Z_{pre}(m, k) = W_{pre}(m, k) \cdot V(m, k), \quad (11)$$

where $$W_{pre}(m, k) = W_{SSF}(m)(L(m, k))^{-1} \quad (12)$$

$$= W_{SSF}(m, k)$$

$$\left( \begin{bmatrix} L_{0,0}(m, k) & 0 & \Lambda & 0 \\ L_{1,0}(m, k) & L_{1,1}(m, k) & & M \\ M & & O & 0 \\ L_{N_r-1,0}(m, k) & & & L_{N_r-1,N_r-1}(m, k) \end{bmatrix} \right)^{-1},$$

and where $W_{SSF}(m)$ is a scalar Spectrum Shaping Filter (SSF) e.g. a frequency domain representation of raised cosine filter. Here, $L(m,k)$ is the result of a Cholesky factorization of the multi-antenna periodogram, i.e.

$$L(m,k)\cdot L^{*T}(m,k)=\hat{R}(m,k). \quad (13)$$

Second Embodiment

In the second embodiment of the invention, the MMSE pre-equalization can be split into two stages: first a temporal pre-equalization (9, 11) and then a spatial decorrelation (10, 12). See FIGS. 4a and 4b for two alternative embodiments of this spatial and temporal pre-equalization.

In the first stage, temporal pre-equalization (11) is done with the frequency domain filter coefficient $$W_{pre,a}(m, k) = \frac{1}{\sqrt{R_a(m, k)}} W_{SSF}(m) \quad (14)$$

for antenna number a, where $W_{SSF}(m)$ is a scalar Spectrum Shaping Filter (SSF) e.g. a raised cosine filter, and $R_a(m,k)$ is a single antenna periodogram for frequency m and block number k. Note that $R_a(m,k)$ is real-valued and positive which simplifies the square root and division calculations.

The periodogram, for antenna number a, can be estimated as a moving average $$\hat{R}_a(m, k) = \sum_{l=0}^{k} \alpha(l) \cdot |V_a(m, l)|^2, \quad (15)$$

where $\alpha(l) l=0,1K,k$, are suitable scaling coefficients, e.g. $\alpha(l)=1(k+1)$. Alternatively this periodogram is estimated in a recursive manner, $$\hat{R}_a(m,k)=(1-\alpha_{Spec})\hat{R}_a(m,k-1)+\alpha_{Spec}|V_a(m,k)|^2, \quad (16)$$

where $\alpha_{Spec}$ is a suitable forgetting factor, e.g. $\alpha_{Spec}=0.01$. Several possible ways of combining these moving average and recursive estimators are possible.

Temporal pre-equalization (11) is done as a scalar frequency domain filtering $$\tilde{Z}_{pre,a}(m,k) = W_{pre,a}(m,k) \cdot V_a(m,k) \quad (17)$$

for each antenna a, frequency index m and block k.

In a second stage, spatial decorrelation (12) is done on temporal pre-equalized data. The temporally pre-equalized signal vector for time n is denoted by $$\tilde{Z}_{pre}(m,k) = [\tilde{Z}_{pre,0}(m,k) \tilde{Z}_{pre,1}(m,k) K \; \tilde{Z}_{pre,N_r-1}(m,k)]^T. \quad (18)$$

The decorrelation is done in frequency domain at each block k of samples $$Z_{pre}(m,k) = L_F^{-1}(k)\tilde{Z}_{pre}(m,k), \quad (19)$$

where $L_F(k)$ is the Cholesky factorization of a covariance matrix $$\hat{R}_F(k) = \begin{bmatrix} r_{0,0}(k) & \ldots & r_{0,N_r-1}(k) \\ M & & M \\ r_{N_r-1,0}(k) & \ldots & r_{N_r-1,N_r-1}(k) \end{bmatrix} \quad (20)$$

such that $$L_F(k)L_F^{*T}(k) = \hat{R}_F(k) \quad (21)$$

and $L_F(k)$ is lower triangular. Note that this covariance matrix is frequency independent such that only one Cholesky factorization is needed for each block k.

To prevent the estimation of the covariance matrix to change too rapidly, filtering between blocks is applied. The covariance matrix can be estimated as a moving average $$\hat{R}_F(k) = \sum_{l=0}^{k} \alpha(l) \cdot \sum_{m=0}^{N_{fft}-1} \tilde{Z}_{pre}(m,l) \cdot \tilde{Z}_{pre}^{*T}(m,l), \quad (22)$$

where $\alpha(l), l=0,1,K, k$, are suitable scaling coefficients, e.g. $\alpha(l)=1/(k+1)$. Alternatively this covariance matrix is estimated in a recursive manner.

$$\hat{R}_F(k) = (1-\alpha_{Spec})\hat{R}_F(k-1) + \alpha_{Spec} \sum_{m=0}^{N_{fft}-1} \tilde{Z}_{pre}(m,k) \cdot \tilde{Z}_{pre}^{*T}(m,k) \quad (23)$$

where $\alpha_{Spec}$ is a suitable forgetting factor, e.g. $\alpha_{Spec}=0.01$. Several possible ways of combining these moving average and recursive estimators are possible.

Third Embodiment

In the third embodiment of the invention, the frequency domain spatial decorrelation as described in the second stage of the previous section is done in the time domain (10). See FIG. 5 for an illustration of this spatial and temporal pre-equalization.

In a first stage, the temporal pre-equalization (11) is done as in the previous section, i.e. as an element wise scalar multiplication $$\tilde{Z}_{pre,a}(m,k) = W_{pre,a}(m,k) \cdot V_a(m) \quad (24)$$

for each antenna a, frequency index m and block k, where $$W_{pre,a}(m,k) = \frac{1}{\sqrt{R_a(m,k)}} W_{SSF}(m). \quad (25)$$

Denote the time domain version of the temporally pre-equalized signal for antenna a as $$\tilde{z}_{pre,a}(n,k) = \frac{1}{N_{fft}} \sum_{m=0}^{N_{fft}-1} \tilde{Z}_{pre,a}(m,k) e^{\frac{j2\pi nm}{N_{fft}}}. \quad (26)$$

By using an "overlap-and-add" approach, as illustrated in FIG. 7, a new time domain sequence is constructed. This is a continuous sequence denoted by $\tilde{z}_{pre,a}(n)$ for each antenna a and with running time index n=0,1,2,K. In vector notation, the temporally pre-equalized signals for time n is denoted by $$\tilde{z}_{pre}(n) = \begin{bmatrix} \tilde{z}_{pre,0}(n) \\ \tilde{z}_{pre,1}(n) \\ M \\ \tilde{z}_{pre,N_r-1}(n) \end{bmatrix}. \quad (27)$$

In a second stage, a time domain spatial decorrelation (10) can be done as $$z_{pre}(n) = L_T^{-1}(k)\tilde{z}_{pre}(n), \quad (28)$$

where $L_T^{-1}(k)$ is the Cholesky factorization of a covariance matrix $$\hat{R}_T(k) = \begin{bmatrix} r_{0,0} & \ldots & r_{0,N_r-1} \\ M & & M \\ r_{N_r-1,0} & \ldots & r_{N_r-1,N_r-1} \end{bmatrix} \quad (29)$$

such that $$L_T(k)L_T^{*T}(k) = \hat{R}_T(k) \quad (30)$$

and $L_T(k)$ is lower triangular.

The covariance matrix can be estimated as a moving average over $N_{SDC}$ samples $$\hat{R}_T(k) = \sum_{n=k \cdot N_{SDC}}^{(k+1) \cdot N_{SDC}-1} \alpha(n)\tilde{z}_{pre}(n) \cdot (\tilde{z}_{pre}(n))^{*T}, \quad (31)$$

where $\alpha(n)$ are suitable scaling coefficients, e.g. $\alpha(n)=1/N_{SDC}$. Alternatively this co-variance matrix is estimated in a recursive manner, $$\hat{R}_T(k) = (1-\alpha_{Spec})\hat{R}_T(k-1) + \alpha_{Spec}\tilde{z}_{pre}(n) \cdot (\tilde{z}_{pre}(n))^{*T} \quad (32)$$

where $\alpha_{Spec}$ is a suitable forgetting factor, e.g. $\alpha_{Spec}=0.01$. Several possible ways of combining these moving average and recursive estimators are possible.

The invention claimed is:
1. A method for channel equalization in a receiver in a multi-user communication system comprising the steps of:
receiving a signal with at least one antenna to produce at least one antenna input stream, measuring a temporal correlation of the at least one antenna input stream and measuring a spatial correlation between antenna input streams when at least two antenna input streams are provided, determining a user-independent pre-equalization filter from the temporal correlation when one antenna input stream is provided or determining a user independent pre-equalization filter from the temporal correlation and the spatial correlation when at least two antenna input streams are provided, filtering the at least one antenna input stream with the user-independent pre-equalization filter, and inputting the at least one filtered stream to at least one user-dependent receiver.

2. The method of claim 1, wherein the multi-user communication system is a code division multiple access (CDMA) communication system and the user-dependent receiver is a Rake receiver.

3. The method of claim 1, wherein the filtering is divided into two processes respectively corresponding to temporal pre-equalization and spatial pre-equalization.

4. The method of claim 3, wherein the temporal pre-equalization and the spatial pre-equalization are performed subsequently.

5. The method of claim 3, wherein the temporal pre-equalization is performed on each antenna input stream separately.

6. The method of claim 1, wherein the filtering is performed fully or partially in frequency domain.

7. The method of claim 6, wherein the filtering in the frequency domain comprises the steps of:

transforming the at least two antenna input streams to frequency domain by means of a fast Fourier transform (FFT), filtering the at least two frequency domain antenna input streams by a frequency domain filter to produce at least two filtered output streams, and transforming the filtered output streams to time domain by means of an inverse fast Fourier transform (IFFT).

8. A receiver in a multi-user communication system comprising:

at least one antenna to produce at least one antenna input streams, a correlation estimation unit (CEU) for measuring a temporal correlation of each antenna input stream, the correlation estimation unit being further adapted for measuring a spatial correlation between antenna input streams when at least two antenna input streams are provided, a user-independent pre-equalization filter to compensate for the temporal correlation, the pre-equalization filter being further adapted to compensate for the spatial correlation when at least two antenna input streams are provided, and at least one user-dependent receiver configured to detect received data symbols of a given user.

9. The receiver of claim 8, wherein the multi-user communication system is a code division multiple access (CDMA) communication system and the user-dependent receiver is a Rake receiver.

10. The receiver of claim 8, wherein the pre-equalization filter is divided into a temporal pre-equalization filter and a spatial pre-equalization filter.

11. The receiver of claim 10, wherein the temporal pre-equalization filter and the spatial pre-equalization filter are arranged in series.

12. The receiver of claim 10, wherein the temporal pre-equalization filter is divided so that each antenna input stream has a separate temporal pre-equalization filter.

13. The receiver of claim 8, wherein the user-independent pre-equalization filter is implemented fully or partially in frequency domain.

14. The receiver of claim 13, wherein the user-independent pre-equalization filter comprises:

a fast Fourier transform (FFT) for transforming the at least two antenna input streams to the frequency domain, a frequency domain filter to produce at least two filtered output streams, and an inverse fast Fourier transform (IFFT) for transforming the at least two filtered output streams to time domain.

* * * * *